Inventors
H. H. MOORE
R. H. F. STRESAU
C. A. AXELSON
D. M. STEARNS

Nov. 29, 1960

H. H. MOORE ET AL 2,961,954

DEPTH CHARGE FIRING MECHANISM

Filed Feb. 1, 1943

Inventors
H. H. MOORE
R. H. F. STRESAU
C. A. AXELSON
D. M. STEARNS

By

Attorney

Nov. 29, 1960    H. H. MOORE ET AL    2,961,954
DEPTH CHARGE FIRING MECHANISM
Filed Feb. 1, 1943    10 Sheets-Sheet 5
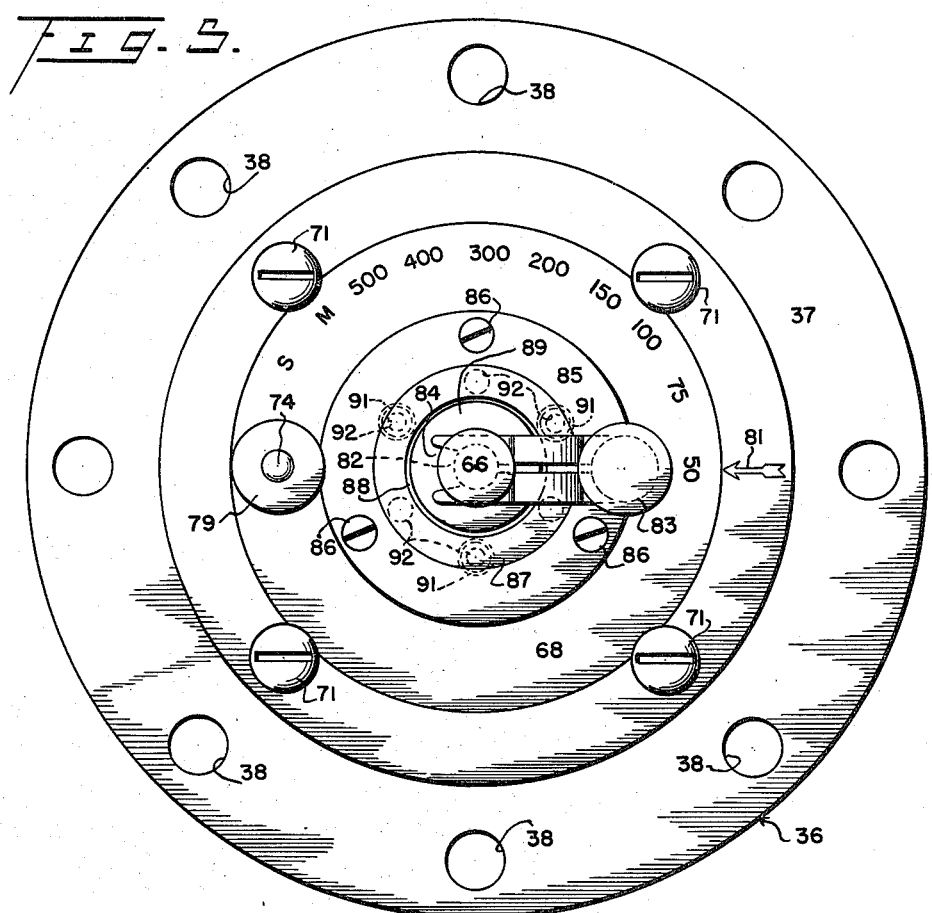
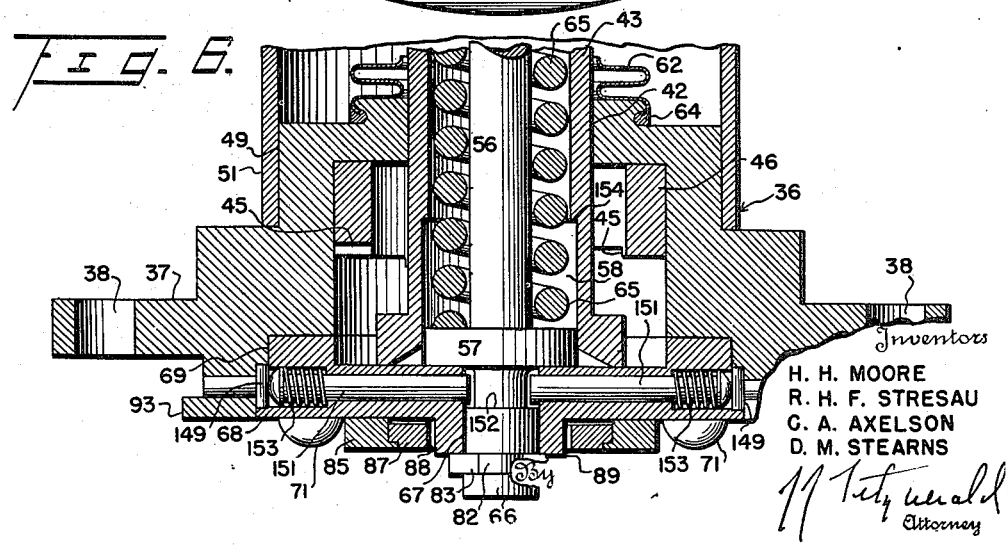
Inventors
H. H. MOORE
R. H. F. STRESAU
C. A. AXELSON
D. M. STEARNS Nov. 29, 1960   H. H. MOORE ET AL   2,961,954
DEPTH CHARGE FIRING MECHANISM
Filed Feb. 1, 1943   10 Sheets-Sheet 6

Inventors
H. H. MOORE
R. H. F. STRESAU
C. A. AXELSON
D. M. STEARNS

By
J. J. Fitzgerald
Attorney

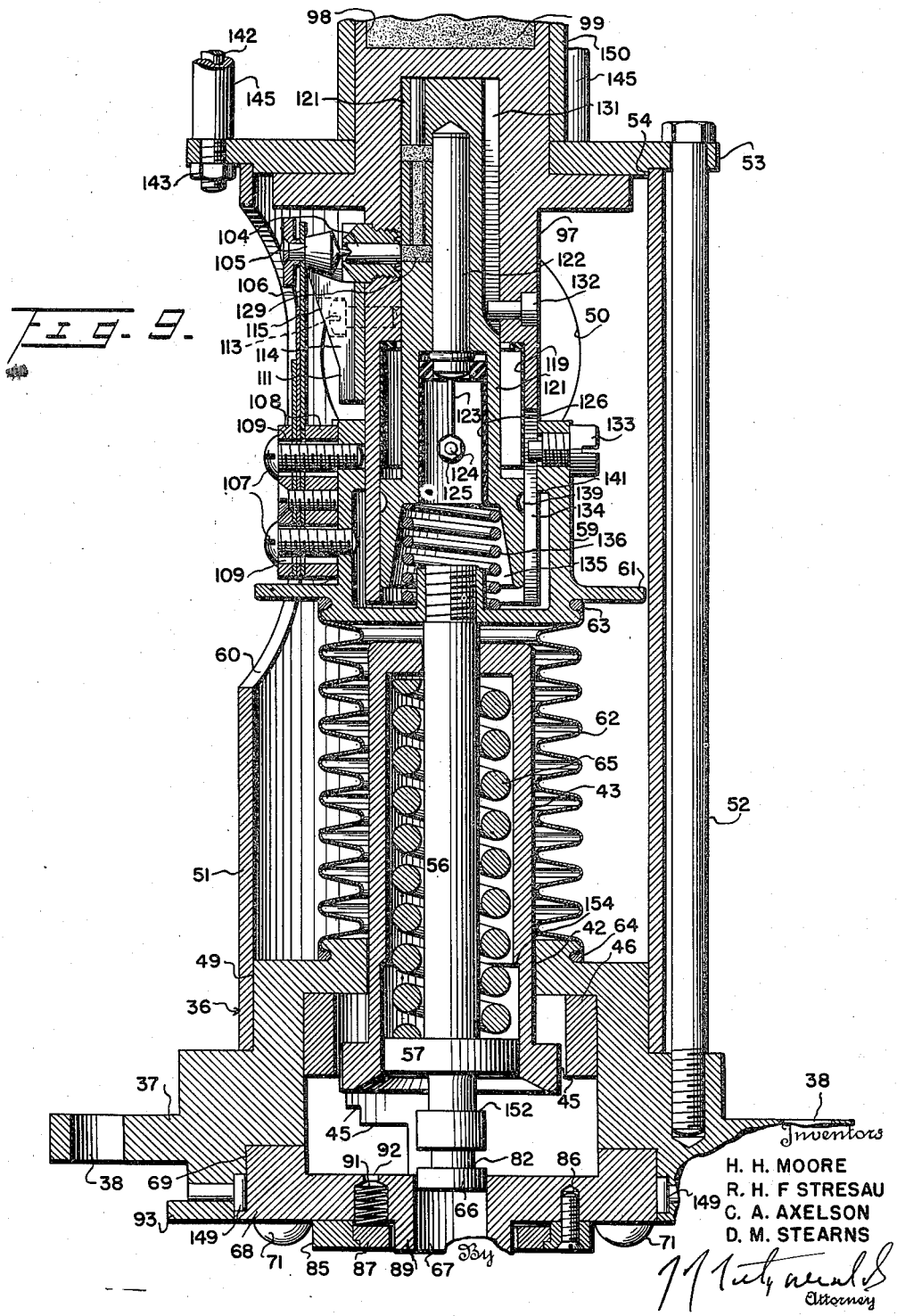

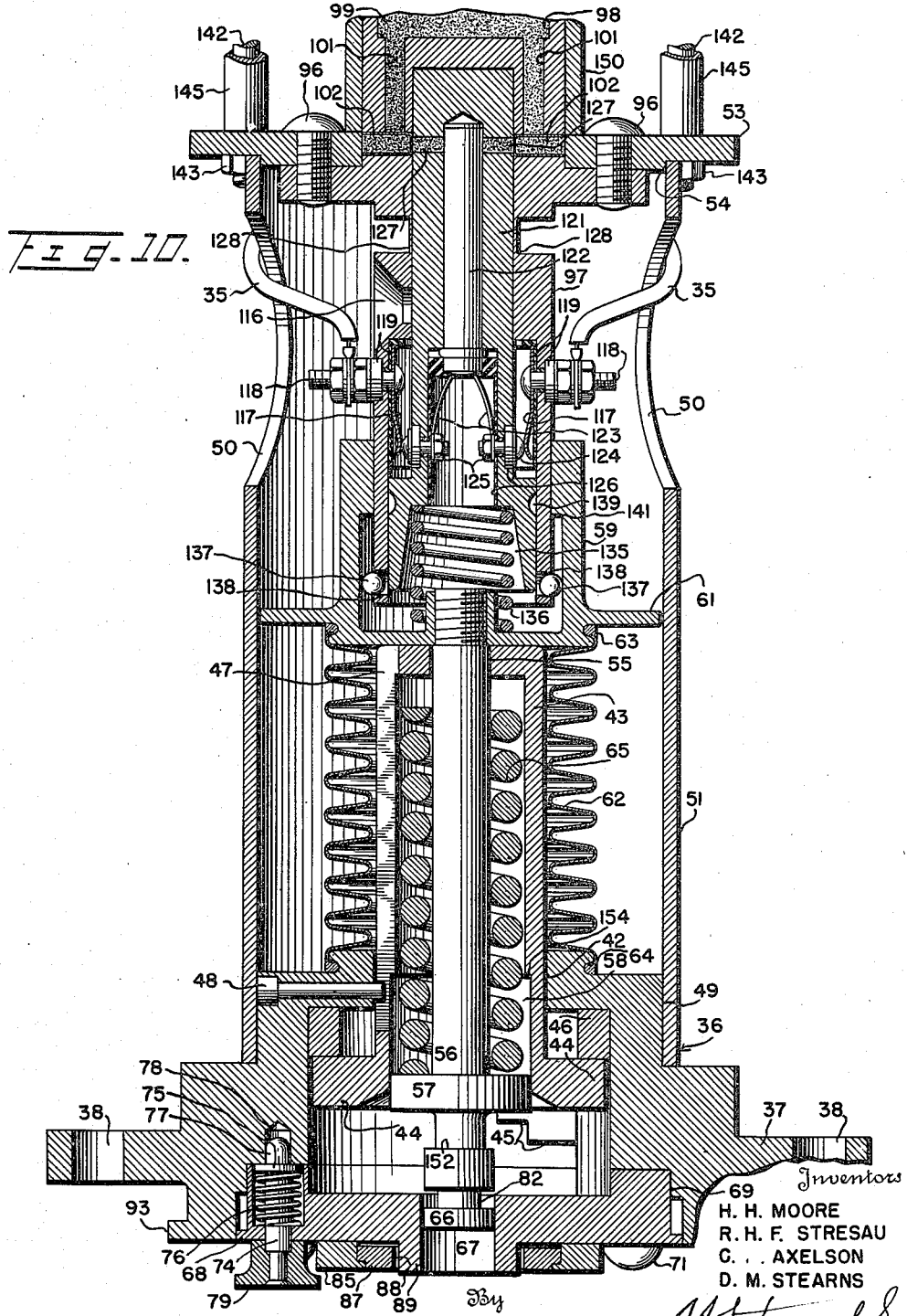

Nov. 29, 1960  H. H. MOORE ET AL  2,961,954
DEPTH CHARGE FIRING MECHANISM
Filed Feb. 1, 1943  10 Sheets-Sheet 9
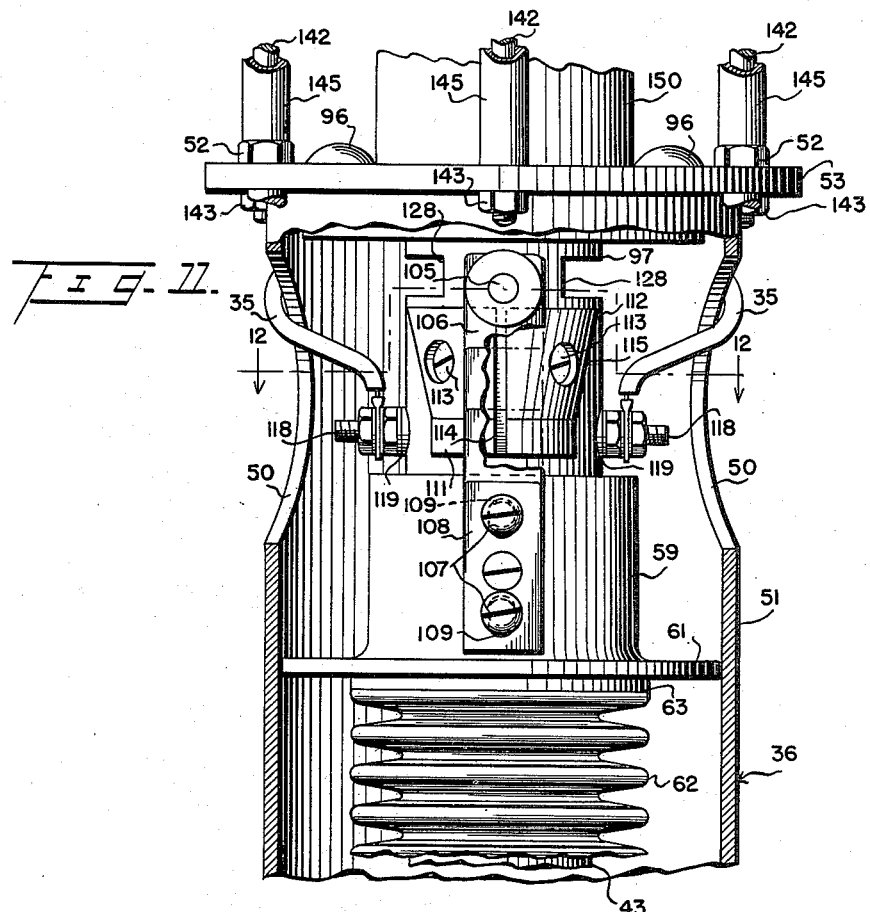
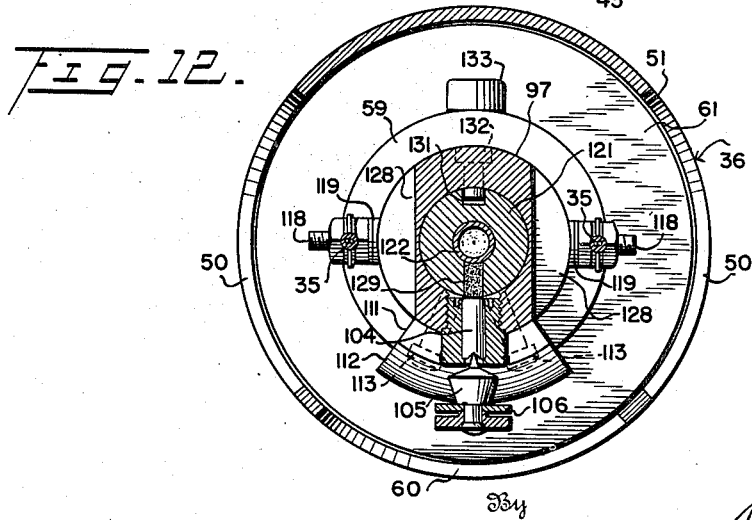
Inventors
H. H. MOORE
R. H. F. STRESAU
C. A. AXELSON
D. M. STEARNS
By
Attorney

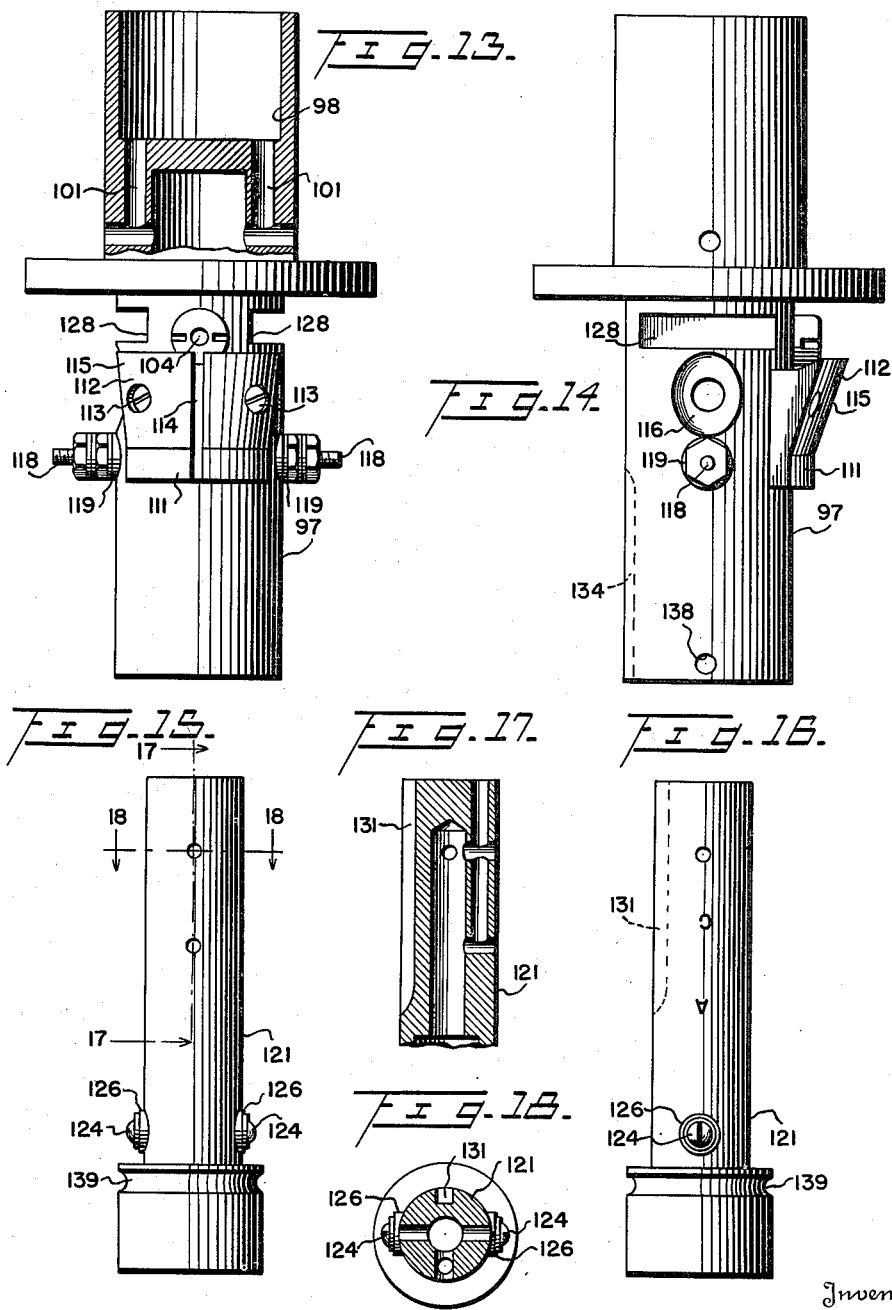

_2,961,954_

DEPTH CHARGE FIRING MECHANISM

Harry H. Moore, Washington, D.C. (Silver Spring, Md.); Richard H. F. Stresau, Takoma Park, Md. (Lake Zurich, Ill.); Carl A. Axelson, Washington, D.C. (Danvers, Mass.); and David M. Stearns, Washington, D.C.

Filed Feb. 1, 1943, Ser. No. 474,354

11 Claims. (Cl. 102—7)

(Granted under Title 35, U.S. Code (1952), sec. 266)

This invention relates to a new and improved mechanism for firing a depth charge in which the firing of the depth charge is accomplished selectively by the closing of a firing circuit from a source of electrical energy to an electro-responsive detonating device or the depth charge may be fired by the operation of a firing pistol controlled by the pressure of the surrounding water. More specifically, the invention relates to a depth charge firing mechanism of a new and improved design having a detonating device therein adapted to be brought into operative relation with respect to a booster charge by a hydrostat in which the external circuit connection to the detonating device is maintained continuously interrupted until the detonating device has been inserted within the booster charge.

In devices heretofore proposed for firing a depth charge it is the usual practice to employ a firing mechanism adapted to fire the depth charge under control of the pressure of the surrounding water when the depth charge has descended to a predetermined depth of submersion therein corresponding to the estimated depth of submersion of the submarine. Other types of firing control devices are adapted to explode the depth charge when a predetermined period of time has elapsed after the depth charge has been launched from an attacking craft. These types of firing control devices possess the disadvantage of exploding the depth charge at a fixed depth of submersion regardless of the depth of submersion of the submarine at which the depth charge is directed.

In the arrangement of the present invention the detonating device is adapted to brought into operative relation with respect to a train of explosive substance, such, for example, as a substance known in the trade as tetryl, arranged intermediate the detonating device and an explosive booster charge disposed within a casing secured to the device, by the operation of a hydrostat in response to the pressure of water within which the device is launched, the premature operation of the hydrostat being prevented by an arming member detachably secured thereto and adapted to be disengaged therefrom as the depth charge is launched.

Concurrently with the movement of the detonating device into operative relation with respect to the explosive train, the detonating device is brought into electrical engagement with a pair of electrical conductors by means of slip connections whereby the detonating device is adapted to be fired by an electrical current flowing through the aforesaid conductors in response to the operation of a firing control mechanism included within the depth charge casing adapted to close a firing circuit from a source of electrical energy in response to a change in the magnetic field adjacent the depth charge as the depth charge moves into a position adjacent a submerged submarine.

There is also provided within the firing mechanism a firing pistol adapted to explode the booster charge in the event that the booster charge is not exploded by the aforesaid firing control mechanism when the depth charge has descended to a predetermined depth of submersion, the pistol being adapted to be fired by the aforesaid hydrostat in response to a depth of submersion corresponding to a predetermined setting of a depth control dial rotatably secured to the device and having a spring pressed pin or plunger adapted to maintain the dial in any of the depth settings thereof. The dial is also adapted to be set to a "safety" position in which the hydrostat is prevented from being moved from the initial unoperated position and to a position in which the depth charge is adapted to be fired by the firing control mechanism and prevented from being fired by the hydrostat.

There is also provided within the device a movable plate or valve adapted to be actuated to the closed position thereof by a sudden impulse of pressure received through the water such, for example, as an impulse of pressure corresponding to the explosion of another depth charge beneath the water within the vicinity of the device thereby to prevent a surge of water within the hydrostat from the pressure impulse sufficient to move the hydrostat to a firing position, the valve being prevented from closing as the result of the gradual increase in the pressure of the water as the depth charge sinks within the water by a plurality of resilient spring devices operatively connected thereto. The device also includes a spring disposed intermediate the aforesaid hydrostat and the detonating device adapted to be compressed by the hydrostat until the hydrostat has moved a distance sufficient to release the detonating device from the initial locked position thereof. When this occurs, the detonating device is moved quickly and positively by the spring to an extended position in operative relation with respect to the aforesaid explosive train and in electrical connection with a pair of conductors included within the firing circuit.

In the event that the depth charge is not fired in response to a change in the magnetic field detected by the aforesaid firing control mechanism, the additional movement of the hydrostat as the depth charge continues to sink within the water causes the firing pin of the pistol to be released and strike against a percussion cap thereby igniting the aforesaid explosive train and firing the depth charge selectively in accordance with the setting of the depth control dial. In the event that the depth control dial is set to a position designated M, the hydrostat is adapted to move through a distance sufficient to cause the detonating device to be brought into operative engagement with the explosive train whereby the depth charge is adapted to be fired magnetically but the additional movement of the hydrostat necessary to operate the firing pistol is prevented, as will hereinafter more clearly appear as the description proceeds, and thus the depth charge is adapted to be fired, if desired, by a change in the magnetic field adjacent thereto and prevented from being fired by the aforesaid firing pistol. Thus, if desired, the hidden submarine is not given a warning by an explosion within the water that it is under attack when the path of travel of the depth charge within the water is not sufficiently close to the submarine to fire the depth charge by the aforesaid firing control mechanism in response to a change in the magnetic field traversed by the depth charge.

One of the objects of the present invention is the provision of a new and improved firing mechanism for a depth charge adapted to be controlled selectively by a predetermined change in the magnetic field traversed by the depth charge and by the pressure of the surrounding water.

Another object is the provision of a new and improved depth charge firing mechanism adapted to explode the depth charge at a predetermined depth of submersion within the water.

Another object is the provision of a hydrostatically controlled depth charge firing mechanism having new and improved means for preventing the premature operation of the hydrostat by a wave or impulse of pressure received through the water.

Still another object is the provision of a depth charge firing mechanism adapted to be fired electrically or mechanically, as the case may be, in which the mechanical firing of the depth charge is prevented selectively.

Still other objects, advantages and improvements will be apparent from the following description taken in connection with the accompanying drawings of which:

Fig. 5 is an enlarged end view of the device;

Fig. 6 is an enlarged fragmentary sectional view showing the device set in a safety position;

Fig. 9 is an enlarged fragmentary view similar to Fig. 3 showing the detonator in an extended position and the firing pistol moved to a firing position;

Fig. 10 is an enlarged fragmentary view in section similar to Fig. 4 showing the detonator moved to the extended position;

Fig. 11 is a fragmentary view partly in section and partly in elevation taken at right angles to Fig. 9 and showing the firing pistol moved to a firing position;

Fig. 12 is a detail sectional view taken along the line 12—12 of Fig. 11;

Fig. 13 is a view in elevation partly in section of a portion of the firing mechanism;

Fig.14 is a view in elevation taken at right angles to Fig. 13;

Fig. 15 is an elevational view of the detonator supporting cylinder;

Fig. 16 is an elevational view taken at right angles to Fig. 15;

Fig. 17 is a fragmentary detail sectional view taken along the line 17—17 of Fig. 15; and, Fig. 18 is a sectional view taken along the line 18—18 of Fig. 15.

Figure 1:
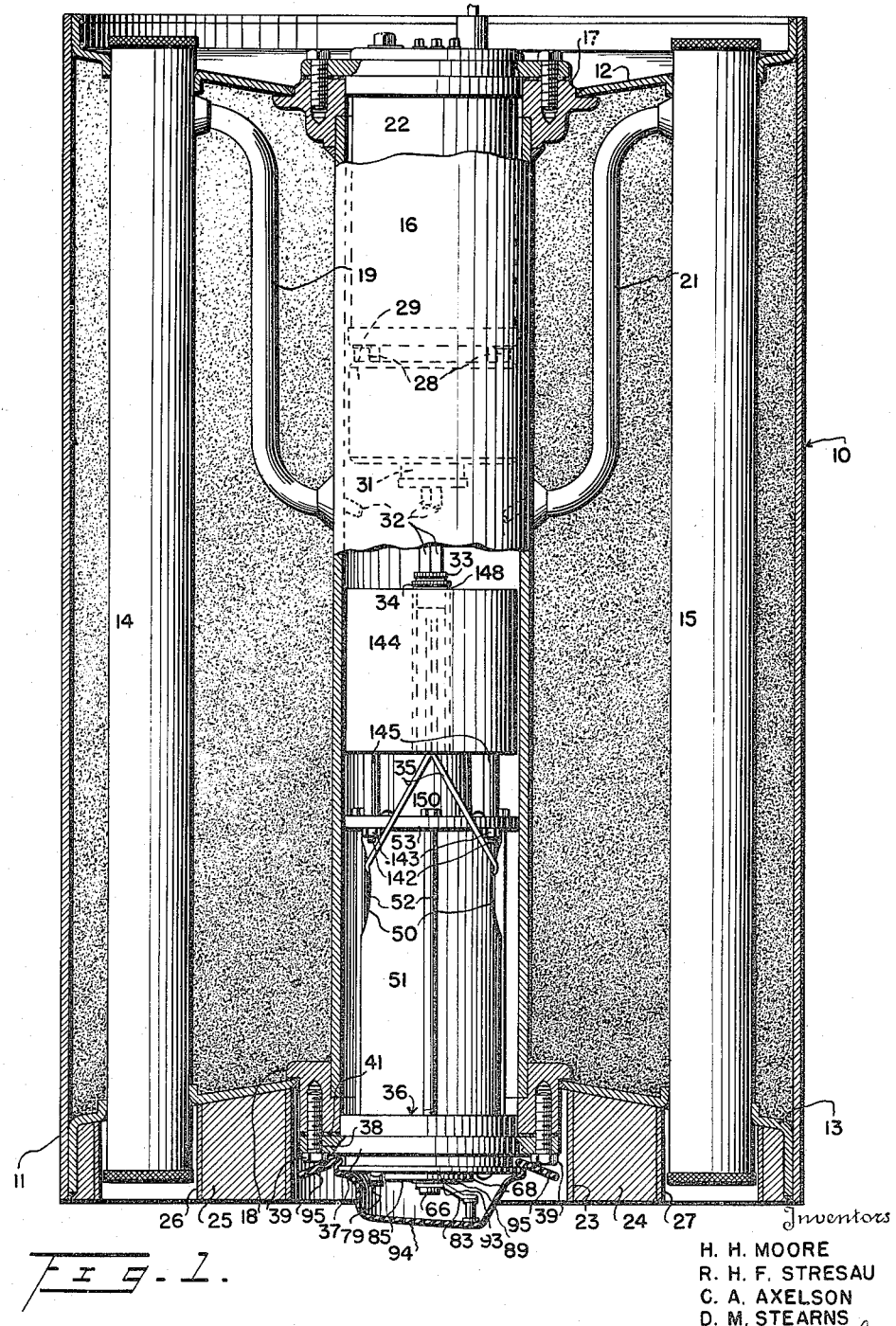
Fig. 1 is a view partly in section and partly broken away of a depth charge suitable for use with and employing the firing device of the present invention.
Figure 2:
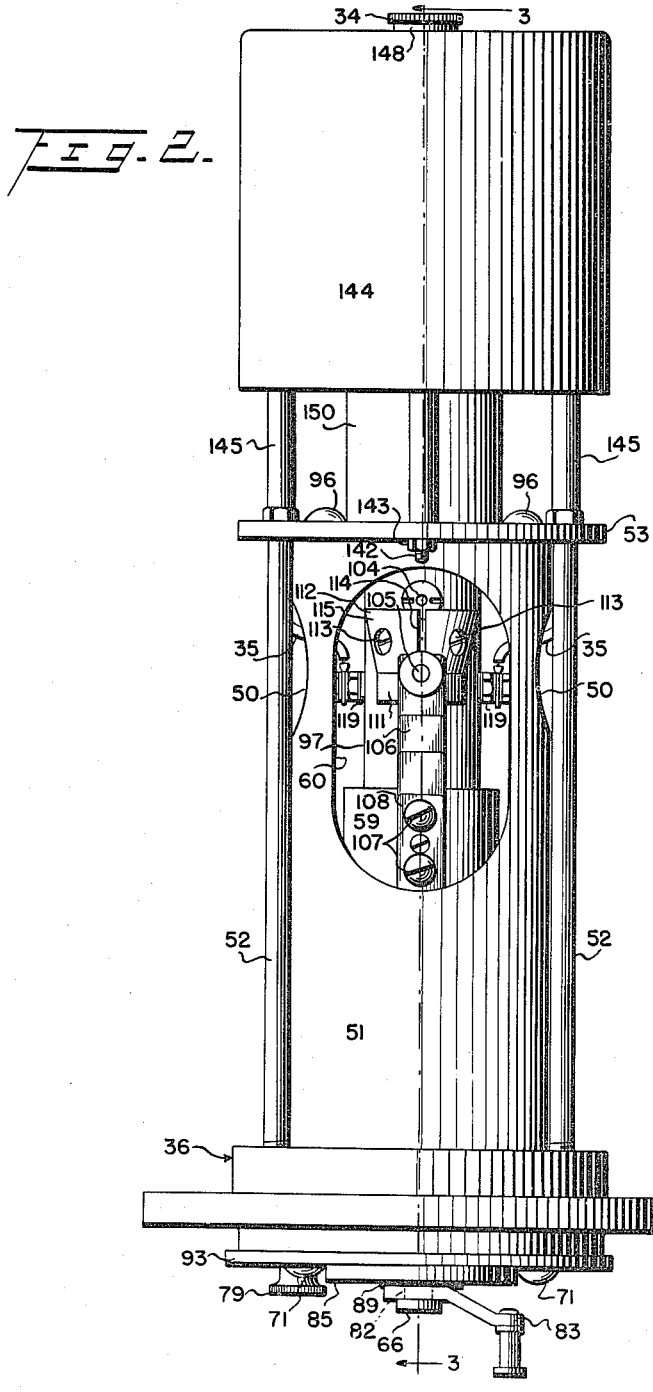
Fig. 2 is an elevational view somewhat enlarged of the firing device of Fig. 1.

Referring now to the drawings and more particularly to Fig. 1 thereof there is shown thereon a depth charge indicated generally by the numeral 10 comprising a cylindrical casing 11 having caps 12 and 13 secured to the ends thereof in any suitable manner as by welding the parts together. Supported by the end caps are a pair of capped tubular members 14 and 15, the tubular members being arranged within suitable apertures formed within the end caps and sealed thereto as by welding the parts together. Within the tubular members 14 and 15 are arranged a pair of gradiometer coils and certain control devices therefor adapted to balance the gradiometer coils with respect to each other sufficiently to prevent the generation of an electrical signal thereby as the coils are moved in any direction within a uniform magnetic field.

Centrally arranged with respect to the casing 11 is a cylindrical supporting member 16 having flanged members 17 and 18 respectively secured to the ends thereof or formed integrally therewith, as the case may be, and extending within centrally arranged apertures within the caps 12 and 13 to which the flanged members are secured. The cylindrical member 16 is provided with a pair of tubes or ducts 19 and 21 extending to the tubular members 14 and 15 within which are arranged a plurality of electrical conductors for establishing an electrical connection between the gradiometer coils and control devices therefor and the signal amplifying and firing control mechanism 22 arranged within the tubular member 16. The cap 13 is provided with a circular partition or well 23 disposed about the annular member 18 and the recessed portion 24 within the cap 13 adjacent thereto within which is arranged a mass of heavy nonmagnetic material 25 such, for example, as lead thereby to increase the weight of the depth charge at the cap 13 thereof sufficiently to cause the depth charge to assume an upright position within the water with the axis of the casing 11 in a substantially vertical position as the depth charge sinks within the water. A pair of tubular members 26 and 27 are secured to the cap 13 thereby to exclude the lead from the ends of the tubular members 14 and 15 respectively.

The firing control mechanism 22 may be of any type suitable for the purpose adapted to be controlled by signals received from the gradiometer coils such, for example, as the firing mechanism disclosed in the copending application of Waldron S. Macdonald et al., Serial No. 453,550, for Firing Control Mechanism for a Depth Charge, filed August 4, 1942.

The firing control mechanism has secured thereto as by the studs 28 a battery case 29 comprising a plurality of dry cells having circuit connections therebetween by means of which the various electrical potentials of the tubes and the electrical energy required for the operation of the firing control mechanism and detonating device are obtained. The battery case is adapted to receive a multi-prong plug 31 having a plurality of terminal connections to which the conductors within the cable 32 are connected thereby providing an arrangement in which the circuit connections from the gradiometer coils within the tubular members 14 and 15 are established to the firing control mechanism by way of the plug 31. Two of the conductors within the cable 32 are connected to the plug 33 arranged within the jack 34 from whence the electrical connection is continued by way of the conductors 35 to the detonating device.

The depth charge firing mechanism indicated generally by the numeral 36 comprises a supporting flange 37 having a plurality of circumferentially arranged apertures 38 therein. A plurality of bolts 39 are respectively arranged within the apertures by means of which the firing mechanism is secured to the flanged portion 18 of the tubular supporting member 16, a gasket 41 being preferably provided to insure a watertight connection therebetween. The supporting flange 37 is provided with a centrally arranged aperture 42 within which is slideably supported a tubular member 43 having an enlarged circular head and a pair of projecting arms 44 thereon adapted to be engaged by a selected pair of stop devices 45 diametrically arranged on the cylindrical member 46 when the tubular member 43 has been moved inwardly by a predetermined amount, as will hereinafter appear in greater detail as the description proceeds.

The tubular member 43 is provided with a slotted portion 47 within which is arranged one end of the pin 48 secured to the flanged support 37 whereby rotative movement of the tubular member with respect to the flanged support is prevented. The flanged support 37 is provided with a cylindrical portion 49 adapted to receive a tubular member 51 and maintain the tubular member in axial alinement with the aperture 42 within the flanged support 37. The tubular member 51 is clamped to the flanged support 37 by a plurality of bolts 52 passing through a circular plate 53 with which the tubular member 51 is in registered engagement as at 54, the tubular member being provided with a pair of diametrically arranged apertures 50 and an additional aperture 60 whereby the assembly and test of the device is facilitated.

The tubular member 43 is provided with an aperture 55 within which is slideably supported a plunger rod 56 having an enlarged cylindrical portion 57 thereon adapted to be slideably supported in the enlarged cylindrical recess 58 within the tubular member 43. The end of the plunger rod 56 is threaded into a cup shaped member 59 having a flanged portion 61 adapted to move axially within the tubular member 51. An expansible bellows 62 such, for example, as a bellows known in the trade as a Sylphon bellows, is secured to the cup shaped member 59 and the flanged support 37 as at 63 and 64 respectively. A resilient spring 65 is arranged about the plunger rod 56 and adapted to impede the inward movement of the plunger rod by engagement of the enlarged cylindrical portion or shoulder 57 thereof when the inner end of the spring has caused the tubular member 43 to be moved inwardly through a distance sufficient for the pair of arms 44 thereof to engage the selected pair of stop devices 45 and be arrested thereby. The plunger rod is provided with an outwardly extending portion 66 slideably supported within an aperture 67 centrally arranged within a depth adjusting dial 68 rotatably mounted within the flanged support 37 as at 69 and maintained in assembled rotative relationship therewith by a plurality of screws 71 threaded within the flanged support 37.

The rotatable dial is provided with a pair of diametrically arranged apertures 72 adapted to be engaged by complementary projecting portions 73 of the cylindrical member 46 whereby the cylindrical member is adapted to be moved rotatably by the dial 68 to a predetermined setting such that the pair of arms 44 of the tubular member 43 is adapted to be engaged by a selected pair of stop devices 45 of the cylindrical member 46. From the foregoing it will be apparent that the degree of inward movement of the plunger rod 56 before the resilient spring 65 is effective to retard and impede the additional inward movement of the plunger rod varies in accordance with the setting of the dial plate 68. The dial plate 68 is also provided with a slideable plunger 74 having a shoulder 75 thereon which coacts with a resilient spring 76 to urge the end 77 of the plunger inwardly into engagement with a selected one of the apertures 78 arcuately arranged within the flanged support 37 and corresponding respectively to a predetermined depth of immersion of the depth charge within the water at which the depth charge is adapted to be fired by the pressure of the surrounding water in the event that the depth charge is not fired by a signal received from the gradiometer coils. The slideable plunger 74 is provided with a suitable knob or handle 79 by means of which the dial plate may be rotated and locked in any desired setting as the plunger rod engages the selected aperture 78.

The dial plate is preferably provided with a plurality of indicia corresponding respectively to each of the settings of the dial plate such, for example, as the indicia comprising the numerals 50, 75, 100, 150, 200, 300, 400 and 500, and the letters M and S illustrated on Fig. 5 which are adapted to be brought selectively into alinement with the indicating mark 81.

The plunger rod 56 is cut away as at 82 thereby to receive an arming fork 83 at the bifurcated end 84 thereof. With the arming fork in the assembled position, the inward movement of the plunger rod 56 is prevented by reason of the engagement of the arming fork with the outer surface of the dial 68.

The dial 68 is provided with an annular retaining member 85 secured thereto as by the screws 86 and having an aperture therein within which is slideably arranged an annular baffle plate 87, the baffle plate having an aperture 88 therein of sufficiently greater size than the cylindrical portion 89 of the dial 68 to permit the flow or passage of water therebetween. The baffle plate is urged outwardly against the retaining against the retaining ring 85 by a plurality of reslient spring members 91 whereby the passage of the water within the flanged support 37 is facilitated by the provision of a plurality of apertures 92 arranged beneath the baffle plate.

The supporting member 37 is also provided with an outwardly projecting flanged portion 93 adapted to be engaged by a flexible cap or cover 94, Fig. 1, of any material suitable for the purpose such, for example, as rubber preferably provided with a pair of tabs 95 to facilitate the assembly of the cap on the flanged portion 93. An arrangement is thus provided in which water is prevented from entering the firing control mechanism until the cap and arming fork have been detached therefrom by moving into engagement with a fixed member during the launching of the depth charge.

Secured to the plate 53 as by the screws 96 is a cylindrical member indicated generally by the numeral 97 upon which is slideably mounted the cup shaped member 59. The member 97 is provided with a recessed portion 98 having an explosive charge 99 therein, the charge also extending within the apertures 101 in substantial abutting relation with an explosive disposed within the caps 102. The explosive 99 is maintained within the recessed portion 98 of the member 97 by a suitable plate or cover 103. The member 97 is also provided with a percussion cap 104 adapted to be exploded by the firing pin 105 secured to the spring 106 when the cup shaped member 59 has been moved by the pressure of the water to a firing position. The spring 106 is secured to the cup shaped member 59 in any suitable manner as by the screws 107 and spacing members 108, sufficient clearance being provided within the spring and spacing members as at 109 to provide an arrangement for adjusting the position of the firing pin with respect to the cup shaped member during the assembly and testing of the device. The firing pin normally is in engagement with the outer cylindrical portion 111 of an arcuately shaped cam 112 secured to the cylindrical member 97 as by the screws 113. The cam is provided with a slotted portion 114 within which the point of the firing pin travels during the movement of the firing pin to the firing position as the cup shaped member 59 is moved inwardly by the pressure of the water within the bellows 62. The firing pin is moved along the inclined portion 115 of the cam member 112 until the firing pin passes beyond the upper end of the cam thereby causing the firing pin to strike the percussion cap with sufficient force to explode the percussion cap.

The member 97 is also provided with an aperture 116, the purpose of which will be more clearly apparent as the description proceeds. There is also provided a pair of slip connections 117 arranged within the tubular member 97 to which are electrically connected the conductors 35 as by the bolts 118 and nuts threaded thereon, the springs 117 being electrically insulated from the member 97 as by the insulating devices 119.

Figure 4:
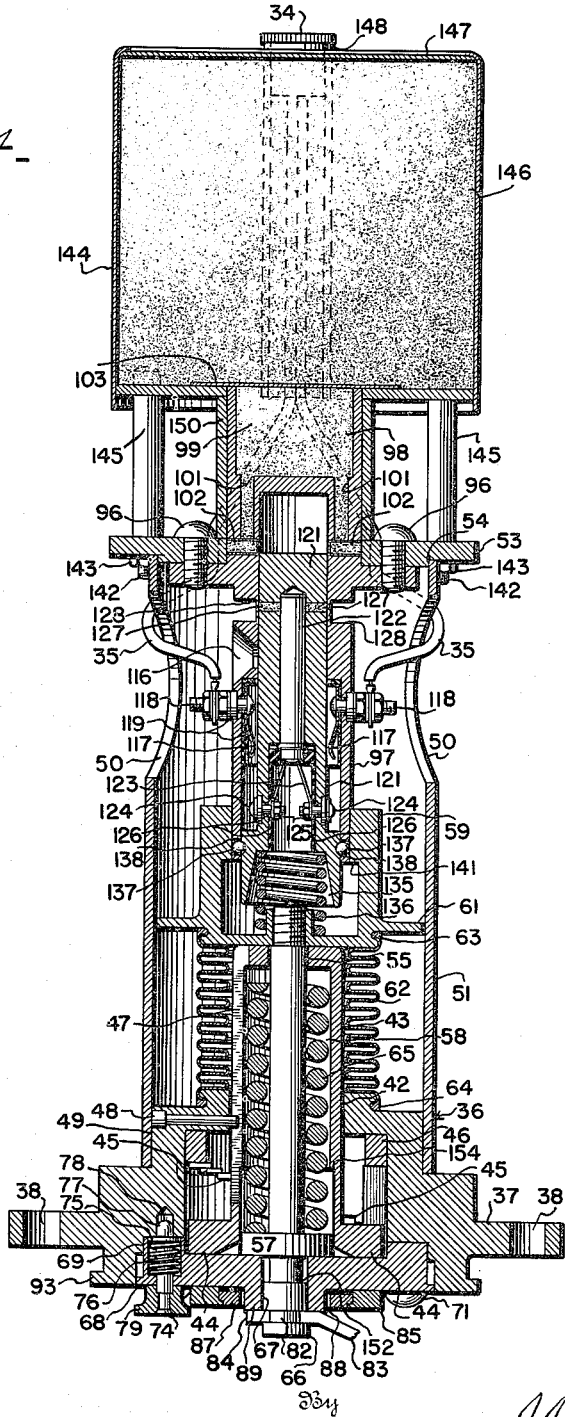
Fig. 4 is a view taken alon the line 4—4 of Fig. 3.

A cylindrical support 121 is slideably arranged within the member 97 and provided with a detonator 122 having a pair of electrical conductors 123 connected to the screws 124 as by the nuts 125, the screws being electrically insulated from the cylindrical support 121 as by the insulating devices 126. The detonator 122 is thus maintained continuously disconnected from the conductors 35 until the detonator has been extended sufficiently to bring an explosive train 127 into substantial abutting relation with respect to the caps 102. When this occurs, the screws 124 are adapted to be engaged by the slip connections 117 thereby closing a circuit from the conductors 35 to the detonating device. With the detonating device in the retracted position shown on Fig. 4 of the drawings the explosive train 127 is disposed opposite a pair of cut away portions 128 of the cylindrical member 96 whereby in the event of the premature explosion of the detonator while in the retracted position, the force of the explosion would pass through the cylindrical member 97 at the cut away portions 128 thereof and prevent the explosion of the depth charge.

Figure 3:
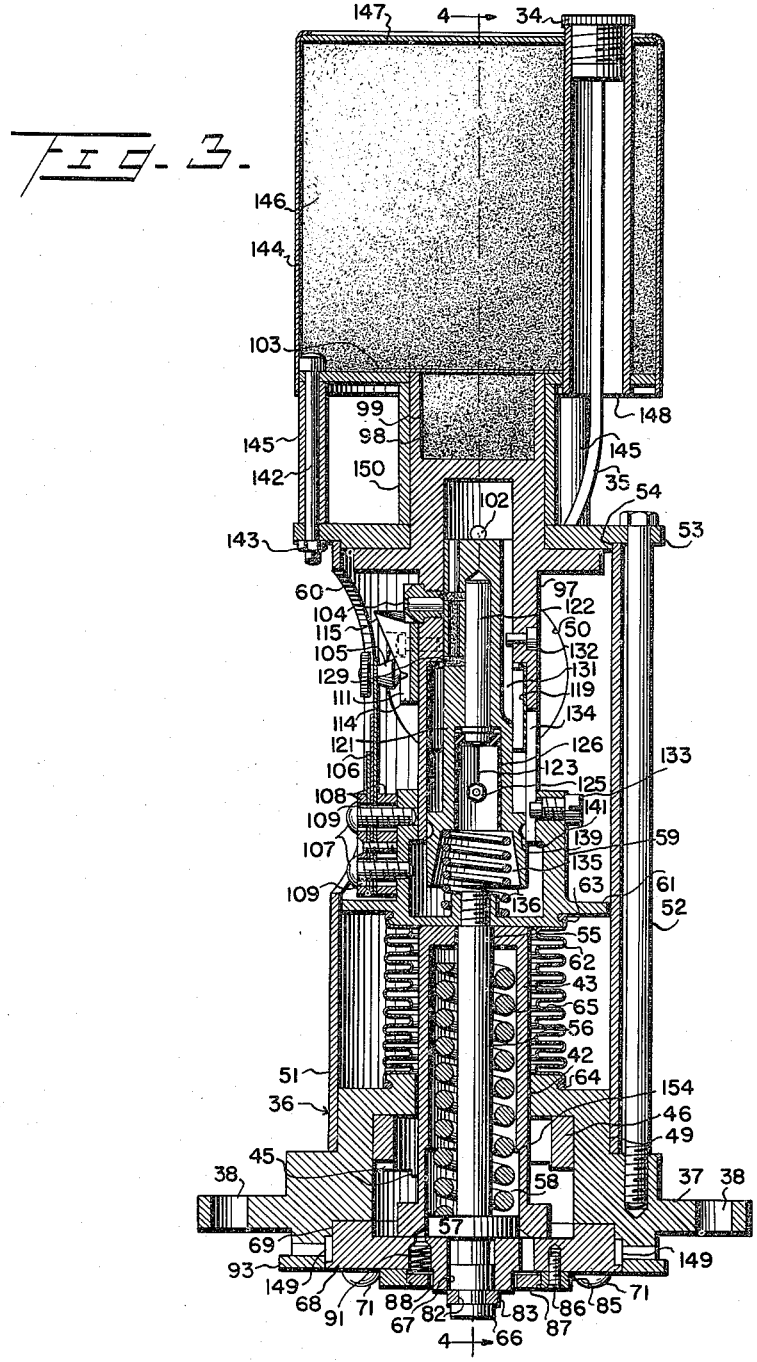
Fig. 3 is a view of the device taken along the line 3—3 of Fig. 2.

The member 121 is also provided with an explosive train 129 adapted to be brought into operative relation with respect to the percussion cap 104 when the detonator is moved to the extended position thereby to establish an explosive communication between the percussion cap and the explosive charge 99 within the recessed portion or chamber 98. The member 121 is provided with a slot 131 within which is arranged a pin or screw 132 secured to the member 97 thereby to prevent rotative movement of the member 121. In a similar manner the cup shaped member 59 is prevented from moving rotatably by a screw 133, Fig. 3, threaded therein and having the inner end arranged within a slot 134 within the cylindrical member 97. The member 121 is provided with a recessed portion 135 within which is arranged a spring 136 adapted to move the member 121 from the initial cocked position thereof to the extended or armed position in response to the pressure of the water within which the device is submerged. The member 121 is releasably locked in the cocked position by a pair of balls 137 arranged within diametrically disposed apertures 138 within the cylindrical member 97 and adapted to be maintained in registered engagement with an annular recessed portion 139 within the member 121. When the cup shaped member 59 has been moved inwardly by the pressure of the water for a distance sufficient for the shoulder 141 thereof to pass beyond the balls 137, the balls are forced out of engagement with the recessed portion 139 of the member 121 and the member 121 is actuated quickly by the spring 136 to the extended position thereof. The balls, however, are retained within the apertures 138 by the members 121 and 59 whereby the plunger rod 56 is prevented from being again moved outward sufficiently for the arming fork to be assembled thereon by the engagement of the shoulder 141 of the member 59 with the balls.

The support 121 is provided with suitable markings such, for example, as the letters C and A, Fig. 16, adapted to be brought into alinement successively with the aperture 116 within the cylindrical member 97 when the support is in the cocked and in the armed positions respectively thereby providing an arrangement in which a visual indication is given to an observer in regard to the instant position of the detonator during the assembly and test of the device.

Secured to the plate 53 as by the bolts 142 and nuts 143 is a cylindrical casing 144, a plurality of sleeves 145 being arranged about the bolts respectively and an additional sleeve 150 being preferably arranged about the upper portion of the cylindrical member 97 to maintain the casing 144 in predetermined space relation with respect to the plate 53. The casing is filled with an explosive charge 146 and provided with a cover 147 secured thereto in any suitable manner as by bending the upper portion of the casing inwardly thereby to form a chamber within which the explosive charge is contained. There is also provided within the casing 144 a tubular member 148 within which is threaded the jack 34 to which are connected the conductors 35.

The operation of the device will now be described. Let it be assumed, by way of example, that the depth regulating dial is set with the numeral 300 opposite the arrow 81 whereby the depth charge is adapted to be fired by hydrostatic pressure at a depth of submergence of 300 feet in the event that the depth charge is not fired by signals received from the gradiometer coils within the tubular members 14 and 15 before this depth of submergence is attained. As the depth charge is launched, the cap 94 and arming fork 83 are detached preferably by a fixed member arranged within the path of travel of the arming fork. As the depth charge sinks within the water, the water flows past the annular baffle plate 87 and thence by way of the apertures 92 within the dial plate 68 into the interior portion of the bellows 62 thereby causing the bellows to expand and move the plunger rod 56 and cup shaped member 59 secured thereto inwardly against the pressure of the spring 136.

When the depth charge has sunk within the water to a predetermined depth such, for example, as 20 feet the member 59 is moved inwardly sufficient for the balls 137 to be released. As the balls fly outwardly from the recessed portion 139 of the cylindrical support 121, the cylindrical support is unlocked and moved inwardly by the spring 136 to the armed position shown on Fig. 10 thereby operatively connecting the detonator to the explosive train and establishing a circuit connection between the detonator and the electrical conductors 35. The detonator is now adapted to be fired by the firing control mechanism 22 in response to a change in the magnetic field detected by the gradiometer coils in the event that the depth charge travels sufficiently near a submerged submarine to receive a signal corresponding to a predetermined gradient of the magnetic field set up by the submarine.

If it be assumed, for the purpose of description, that the depth charge does not pass sufficiently near the submarine to fire the depth charge electromagnetically, the depth charge continues to sink within the water until it reaches a depth of 300 feet whereupon the depth charge is fired by the firing pin 105 striking against the percussion cap 104.

As the depth charge continues to sink within the water beyond the 20 foot depth therein the increase in the pressure of the surrounding water causes the bellows 62 and cup shaped member 59 to continue to move inwardly. When the plunger rod 56 has moved a predetermined distance controlled by the setting of the depth regulating dial 68, the spring 65 is brought into engagement with the inner end of the tubular member 43 thereby additionally to impede and retard the movement of the plunger rod as the depth charge continues to move downward within the water. When the depth charge has sunk to a depth of 300 feet within the water the firing pin is moved along the inclined portion 115 of the cam 112 until the firing pin passes beyond the upper end of the cam thereby causing the firing pin to strike the percussion cap 104 and fire the depth charge.

In the event that a sudden shock or wave of pressure is received during the descent of the depth charge within the water such, for example, as may be caused by the explosion of another depth charge within the water, the baffle plate 87 is forced inwardly by the pressure of the surrounding water sufficiently to move into engagement with the dial plate 68 and effectively close the apertures 92 therein thereby preventing a sudden flow of water within the bellows 62 sufficient to move the cup shaped member 59 to the firing position in which the percussion cap is fired by the firing pin 105. As the shock or wave of pressure subsides, the baffle plate 87 is moved outwardly by the spring members 91 thereby again establishing communication between the interior of the bellows 62 and the surrounding water by way of the apertures 92 within the depth regulating dial 68.

Figure 7:
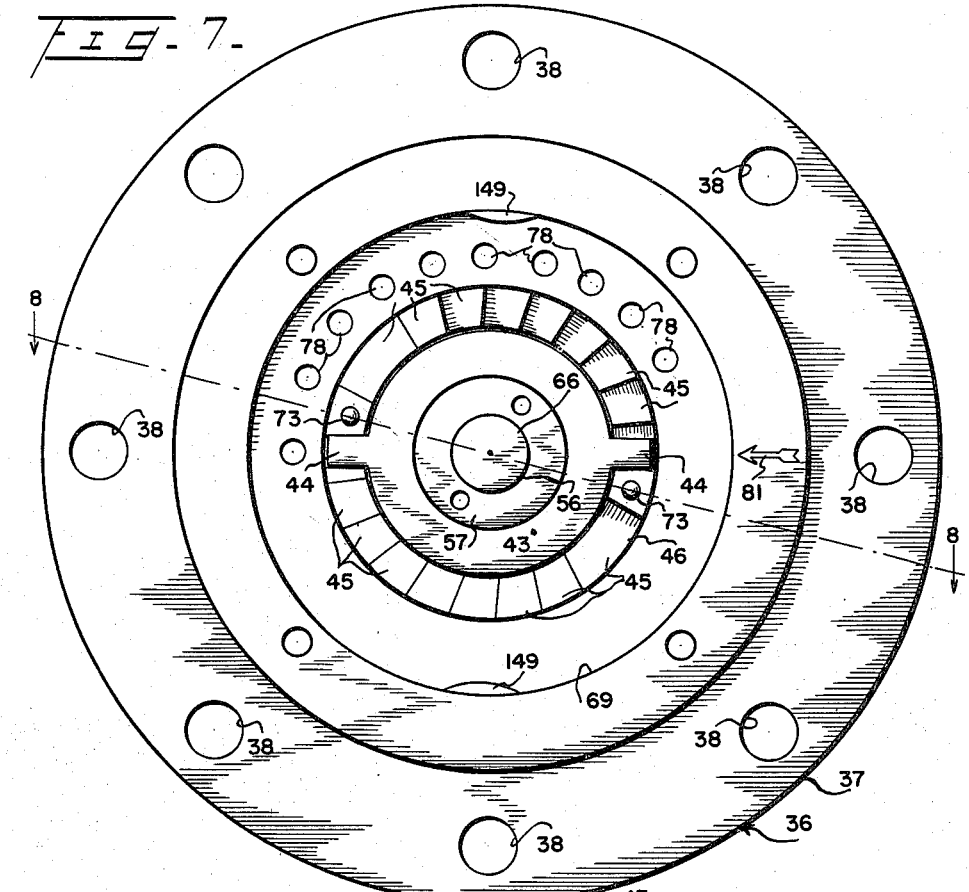
Fig. 7 is a plan view similar to Fig. 5 with the dial and arming fork removed.

The operation of the safety feature of the device will best be understood by consideration of Figs. 6 and 7 of the drawings. The supporting flange 37 is provided with two diametrically arranged inwardly protruding cam members 149 adapted to engage the heads of the locking pins 151 slideably arranged within the dial 68 and force the locking pins inwardly toward the plunger rod 56 sufficiently to prevent endwise movement of the plunger rod by engaging the rod at the shoulder 152 thereof when the dial has been moved to the safety position S. When the depth regulating dial is moved away from the position S the locking pins 151 are moved away from the plunger rod by the resilient spring members 153 respectively arranged thereon sufficiently to permit endwise movement of the plunger rod 56.

Figure 8:
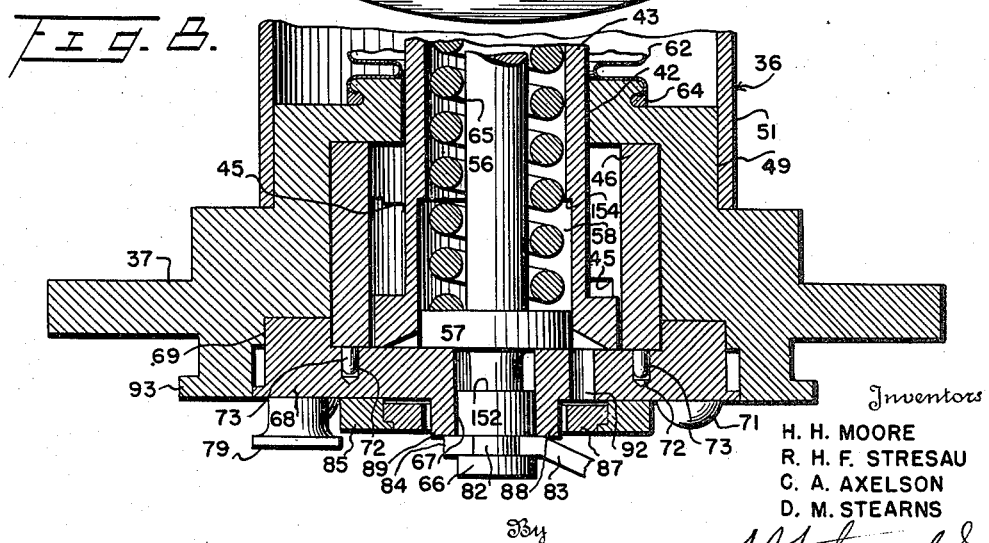
Fig. 8 is a view of the device taken along the line 8—8 of Fig. 7 and showing the depth adjusting dial and arming fork in the assembled position.

When the depth regulating dial is moved to the position M the plunger rod 56 is allowed to move inwardly sufficient to release the locking balls 137 and thereby cause the detonator to be actuated by the spring member 136 to the armed position. The plunger rod, however, is prevented from moving inward sufficiently to release the firing pin by reason of the engagement of the raised cylindrical portion 57 thereof with the shoulder 154 formed within the tubular member 43, the tubular member being prevented from moving inwardly from the position shown on Fig. 8 by the selected pair of stop devices 45 on the cylindrical member 46. With the depth regulating dial set to position M the depth charge is adapted to be fired electrically by the firing control mechanism 22 and, in the event that the depth charge does not pass sufficiently near the submerged submarine to fire the depth charge electrically, the depth charge may, if desired, be permitted to sink to the bed of the body of water within which the depth charge is launched without firing the depth charge by hydrostatic pressure.

An arrangement is thus provided in which, if desired, the submarine does not received a warning that it is under attack by a depth charge in the event that the depth charge does not pass sufficiently close to the submarine to injure or damage the same. In practice, it has been found desirable, particularly in cases where the water is of sufficient depth to prevent the subsequent recovery of the depth charge from the bed of the body of water, to prevent the firing of the depth charge by hydrostatic pressure in the event that the depth charge effectively misses the target. In the device of the present invention the depth charge is adapted to be fire selectively by hydrostatic pressure in accordance with the setting of the depth regulating dial 68.

The terms "inwardly" and "outwardly" are purely relative as the depth charge is use may occupy any position. They are accordingly to be interpreted with the accompanying drawings.

Whereas, in the foregoing description the detonating device is fired electromagnetically by a firing control mechanism in response to the gradient of the magnetic field detected by a pair of balanced gradiometer coils, it will be understood that this is by way of example only as the depth charge firing mechanism of the present invention may be employed with any type of firing control mechanism having means adapted to close a firing circuit.

While the invention has been described with particularity as to one preferred embodiment of a combination of mechanisms and of each of the various elements of the combination, it is to be understood that this has been done for purposes of disclosure and that various changes and substitutions may be readily apparent to those skilled in the art after understanding the invention herein disclosed, and that the terms employed in the claims are, therefore, to be considered as words of description rather than of limitation.

The invention herein described and claimed may be manufactured and used by or for the Government of the United States of America for governmental purposes without payment of any royalties thereon or therefor.

What is claimed as new and desired to be seured by Letters Patent of the United States is:

1. In a firing device, in combination, a casing, a moveable pressure responsive device arranged within said casing, a releasably locked detonating device, means for yieldably urging said detonating device toward an extended position, means controlled by said pressure responsive device for releasing said detonating device when the pressure responsive device has moved from an initial position to a predetermined moved position, and means including a can actuated firing pin for firing said detonating device when the pressure responsive device has moved a predetermined distance beyond said moved position.

2. In a device of the character disclosed for firing an explosive depth charge, the combination of pressure responsive means adapted to be moved to different settings corresponding respectively to predetermined depths of submersion of the device within a body of water, detonating means including an electro-responsive detonator having a pair of terminal connections operatively connected thereto, a firing circuit, means for moving said terminal connections into operative engagement with said firing circuit when the pressure responsive device has moved to one of said settings, a percussion device operatively connected to said detonating means, and means including a firing pin actuated when said pressure responsive device is moved to another of said settings for causing the detonating means to be exploded by said percussion device, and means including an arcuate cam member secured to said device for actuating said firing pin.

3. In a device of the character disclosed for firing a depth charge at a predetermined depth of submersion within a body of water, the combination of pressure responsive means, a slideable member adapted to be actuated by said pressure responsive means to different positions including an armed position and a firing position, a resilient spring member adapted to resist yieldably the movement of said slideable member, a rotatable dial having a plurality of pairs of stop devices operatively connected thereto and settable to different positions corresponding respectively to predetermined depths of submersion of the device within the water at which the slideable member is adapted to be moved to said firing position, a cylindrical member disposed about said slideable member having a pair of outwardly projecting arms thereon adapted to engage a selected pair of said stop devices, and means on said cylindrical member adapted to be engaged by said resilient spring member and thereby control the depth of submersion at which the slideable member is moved to said firing position.

4. In a firing device for an explosive depth charge adapted to be launched within a body of water, the combination of an explosive train, a percussion cap operatively connected to said explosive train, a slideable member having an initial position and a firing position, means controlled by the pressure of the water for moving said slideable member from said initial position to said firing position, a resilient firing member having a firing pin secured thereto, means for securing the firing member to said slideable member, a cam device arranged within the path of travel of the firing pin adapted to store energy in said resilient firing member progressively in accordance with the degree of movement of said firing pin with respect to said cam device during movement of the slideable member from said initial position, and means for causing the firing pin to strike and thereby explode the percussion cap when the slideable member is moved to said firing position.

5. In a firing pistol for a depth charge, the combination of an explosive charge, a percussion cap adapted to fire said explosive charge, a firing pin adapted to explode said percussion cap, said firing pin having an initial position and a firing position, slideable means including a pressure responsive member adapted to move the firing pin from said initial position to said firing position, an arcuate cam device having a slotted portion therein within which the firing pin is adapted to move, said cam device having an inclined surface adapted to cock said firing pin as the firing pin is moved by said slideable means to said firing position, and means effective when the firing pin has been moved to said firing position for causing the firing pin to explode said percussion cap.

6. In a depth charge firing mechanism, a chamber having an explosive charge therein, a substantially smaller chamber in abutting relation to the first named chamber having a pair of ducts therein, an explosive substance arranged within said smaller chamber and said ducts, a slideable support having a detonating device centrally disposed therein and secured thereto, a pair of explosive trains arranged transversely within said slideable support operatively connected to said detonating device and adapted to be brought into abutting relation with said pair of ducts as the detonating device is moved from a retracted position to an extended position, means for releasably locking said support and detonating device in said retracted position, a resilient member adapted to move the support from the retracted position to said extended position, means controlled by the pressure of the water within which the depth charge is submerged for causing said support and detonating device to be moved by said resilient member to said extended position, and means including a firing circuit adapted to be connected to said detonating device as the detonating device moves into said extended position for causing the detonating device to fire said explosive trains in response to a predetermined characteristic of the magnetic field within which the depth charge travels.

7. In a device of the character disclosed for firing an explosive charge, in combination, a supporting member, a plunger slideably arranged within said supporting member and movable to different positions including an initial position and an armed position, said plunger having a recessed portion at the outer end thereof, a bifurcated arming member detachably arranged within said recessed portion adapted to prevent movement of the plunger inwardly from said initial position, a pressure responsive device operatively connected to said plunger and adapted to move the plunger inwardly to said armed position after the arming member has been detached therefrom, a resilient device adapted to resist yieldably the inward movement of said plunger, detonating means, a cylindrical member operatively connected to said resilient device adapted to support said detonating means and having an annular recessed portion arranged circumferentially therein, a fixed tubular member within which the cylindrical member is slideably disposed, said tubular member having a pair of apertures diametrically arranged therein in abutting relation with said annular recessed portion of the cylindrical member when the cylindrical member is in the retracted position, a pair of locking balls respectively arranged within each of said apertures and adapted to engage and lock the cylindrical member in said retracted position at the recessed portion thereof, a second cylindrical member secured to said plunger adapted to hold said balls in locking engagement with the recessed portion of the first named cylindrical member when the plunger is in said initial position and thereby releasably retain the first named cylindrical member in the retracted position, a recessed portion within said second cylindrical member adapted to release said locking balls as the plunger is moved inwardly to said armed position, means including said resilient device for actuating the first named cylindrical member and detonating means to an extended position as the balls are released, and means included within said first named cylindrical member for preventing the movement of said plunger outwardly to said initial position when the detonating means has been actuated to said extended position.

8. In a device of the character disclosed for firing an explosive depth charge, the combination of a slideable member moveable to an initial position and to a firing position, a pressure responsive device adapted to actuate the slideable member to said firing position in response to a predetermined depth of submersion of the device within the water within which the depth charge travels, detonating means, means controlled by said pressure responsive device for firing said detonating means as the slideable member moves into said firing position, a chamber in communication with the interior of said pressure responsive means having a plurality of orifices adapted to permit the flow of water therethrough as the depth charge sinks within the water, a moveable annular member adapted to close said orifices in response to a sudden impulse of pressure received through the water, and means including a plurality of resilient devices for yieldably maintaining said annular member in predetermined space relation with respect to said orifices as the depth charge sinks within the water when a sudden impulse of pressure is not received through the water.

9. In a firing device for an explosive depth charge adapted to be launched within a body of water, the combination of an explosive train, a first slideable member having an initial position, an armed position, and a firing position, a second slideable member arranged within said device and releasably locked thereto, means responsive to the pressure of the water for moving the first slideable member from said initial position to said armed position, means for releasing said second slideable member by said first slideable member as the first slideable member is moved toward said armed position, a detonating device mounted on said second slideable member, a first resilient means opposing the movement of said first slideable member, a second resilient means interposed between said slideable members and effective to move said second slideable member to a firing position and to move the detonating device into adjacent relationship with said explosive train upon disengagement of said second slideable member from said device, a cam member, and means including a firing pin secured to said first slideable member and effective by movement thereof along said cam member for firing said detonating device when said second slideable member has been moved to said last named firing position.

10. In a device of the character disclosed for firing an explosive depth charge, the combination of an explosive charge, detonating means for firing the explosive charge, means for firing said detonating means selectively in accordance with a predetermined change in the magnetic field within which the depth charge travels, a second means for firing the explosive charge, means including an expansible bellows responsive to the pressure of the water for arming both of said firing means during descent of the depth charge through the water, and means controlled by said bellows for firing said second means when the depth charge has sunk to a predetermined depth.

11. In a device of the character disclosed for firing a depth charge at a predetermined depth of submersion within a body of water, the combination of a pressure responsive device, a casing enclosing said pressure responsive device, a member slideably arranged on said casing for moving to different positions including an armed position and a firing position as the pressure responsive device is actuated in response to the pressure of the water, resilient means for resisting yieldably the movement of said slideable means, a rotatable member having a plurality of pairs of stop devices operatively connected thereto and settable to different positions corresponding respectively to predetermined depths of submersion of the device within the water at which the slideable member is moved to said firing position, a cylindrical member disposed about said slideable member and having a pair of outwardly projecting arms thereon for engagement with a selected pair of said stop devices, means on said cylindrical member adapted to be engaged by said resilient means for controlling the depth of submersion at which the slideable member is moved to said firing position, and means including a cam actuated firing pin for firing the depth charge as the slideable member moves to said firing position.

References Cited in the file of this patent

UNITED STATES PATENTS

| | | |
|---|---|---|
| 571,739 | Badt | Nov. 24, 1896 |
| 1,172,636 | Semple | Feb. 22, 1916 |
| 1,314,664 | Huber | Sept. 2, 1919 |
| 1,336,391 | Semple | Apr. 6, 1920 |
| 1,368,569 | Minkler | Feb. 15, 1921 |
| 1,617,674 | Dieter | Feb. 15, 1927 |
| 2,399,523 | Van Atta et al. | Apr. 30, 1946 |